March 31, 1953  E. B. ANNIS  2,633,367
DEVICE FOR PREVENTING TRACTORS
FROM TURNING OVER BACKWARDS
Filed Feb. 4, 1952  2 SHEETS—SHEET 1

Inventor
Eben B. Annis

Attorneys

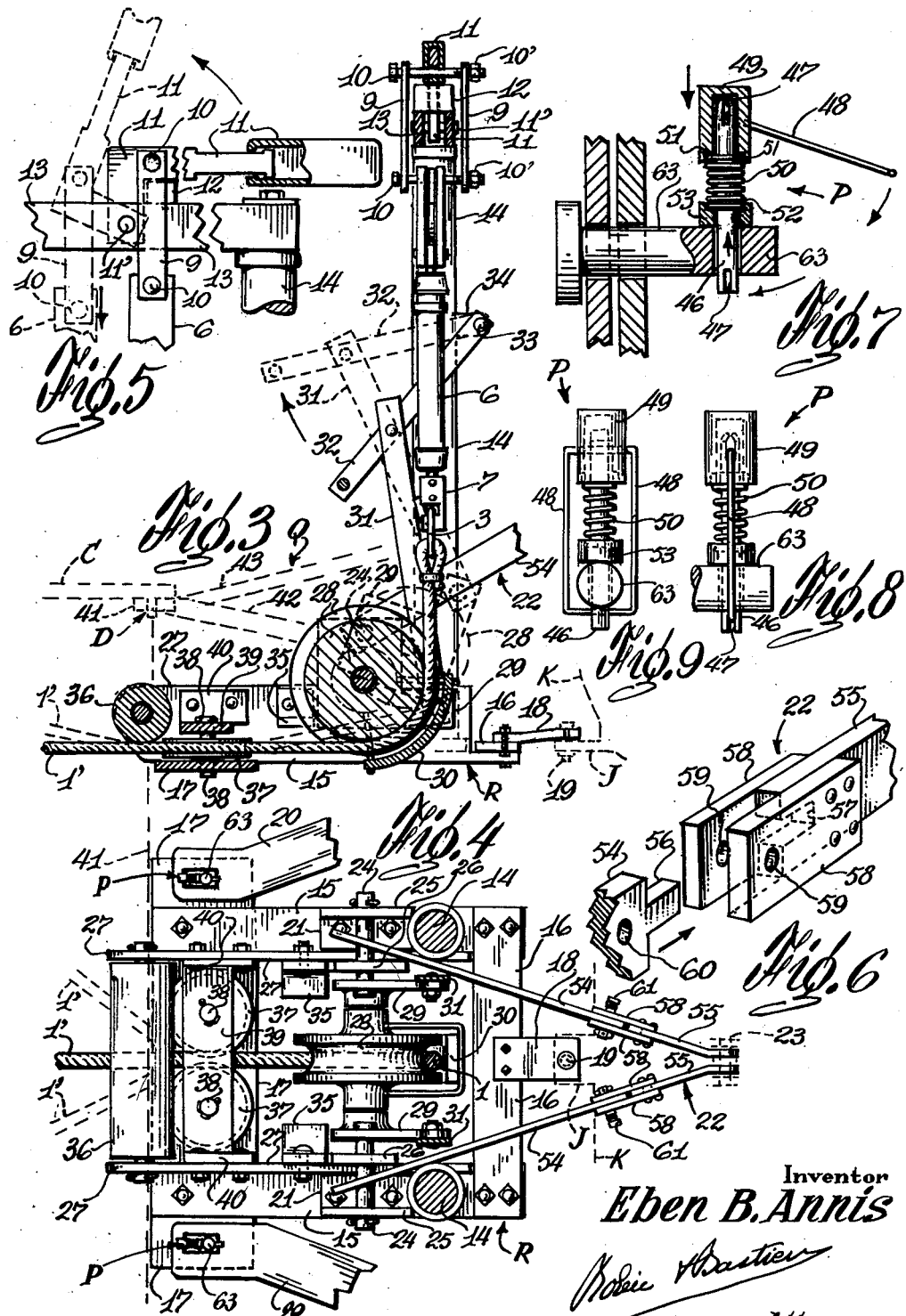

Patented Mar. 31, 1953

2,633,367

UNITED STATES PATENT OFFICE 2,633,367

DEVICE FOR PREVENTING TRACTORS FROM TURNING OVER BACKWARDS

Eben B. Annis, South Stukely, Quebec, Canada

Application February 4, 1952, Serial No. 269,797

12 Claims. (Cl. 280—33.44)

The present invention relates to a device for preventing tractors from turning over backwards when pulling a load, and more particularly to an improvement over the device described in my co-pending U. S. patent application Ser. No. 181,671 filed on August 26, 1950.

As described in the above mentioned patent application, overturning of farm tractors occurs frequently when they are pulling heavy loads due to the overturning couple developed by the driving mechanism of the tractor at the rear traction wheels of the same; thus causing many serious accidents on farms.

In the above mentioned patent application there is described a rigid drawbar connecting the vehicular load to the rear axle housing of the tractor, said drawbar being capable of withstanding both compression and tension stresses and an auxiliary tension device comprising a cable and an extensible resilient unit also attached to the load and to the tractor and extending below said drawbar. This unit is connected to the rear axle housing of the tractor at a point situated below the connection of the drawbar to said tractor.

With this arrangement, difficulty has been experienced in connecting the auxiliary device in a state of initial tension. Moreover, when the auxiliary device is not in use, it must be completely removed and put away.

Accordingly, the general object of the improved device, according to the present invention, is the provision of means to obviate the above mentioned defects.

An important object of the present invention is the provision of a device for preventing tractors from turning over backwards, said device being provided with means to facilitate the tensioning thereof.

Another important object of the present invention is the provision, in a device of the character described, of means to increase the ratio: elongation of the auxiliary tensioning device over the angle of vertical rotation of the tractor, as compared to the arrangement of the above mentioned application.

Yet another important object of the present invention is the provision, in a system of the character described, of means for properly guiding the cable of the tensioning unit during turning movements of the tractor.

Still another object of the present invention is the provision, in a device of the character described, of means whereby the extensible resilient unit need not be disconnected and removed from the tractor when the latter is disconnected from the load.

Still another object of the present invention is the provision of improved means for attaching a device for preventing tractors from turning over backwards, said improved means being quickly and easily removed from the tractor.

Yet another important object of the present invention is the provision of a specially designed locking pin for certain elements of the device according to the invention, which pin may not become accidentally free and will not be subject to clogging by foreign matter.

Yet another object of the present invention is the provision of specially designed braces for connecting certain elements of the device according to the invention, said braces being made of two end abutting elements removably attached and so shaped as to resist bending at their junction.

The foregoing and other objects of the invention will become more apparent during the following disclosure and by referring to the drawings in which:

Figure 3 is a longitudinal section of the same;

Figure 4 is a plan section of the same;

Figure 5 is a fractional elevation of the top portion thereof;

Figure 6 is a fractional perspective view showing the connection for the two sections of the special braces used in the device according to the invention;

Figures 7, 8 and 9 show respectively a section, a side view and a front view of the locking pin used in conjunction with the device according to the invention.

Figure 1:
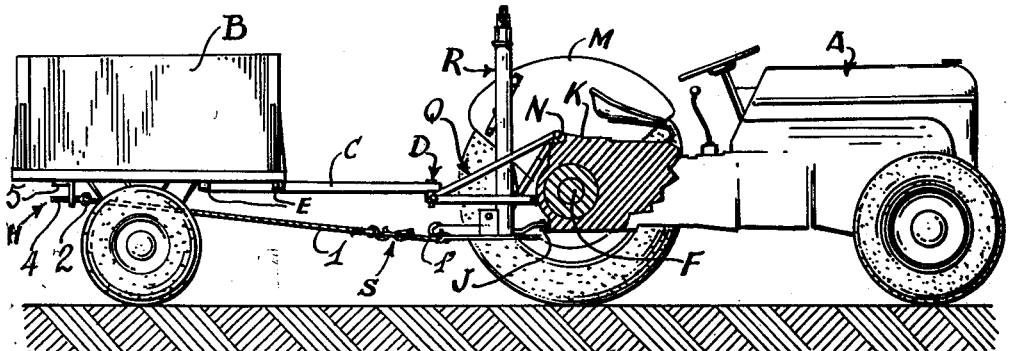
Figure 1 is a schematic representation of a tractor and of a load drawn thereby and showing the device according to the invention.
Figure 2:
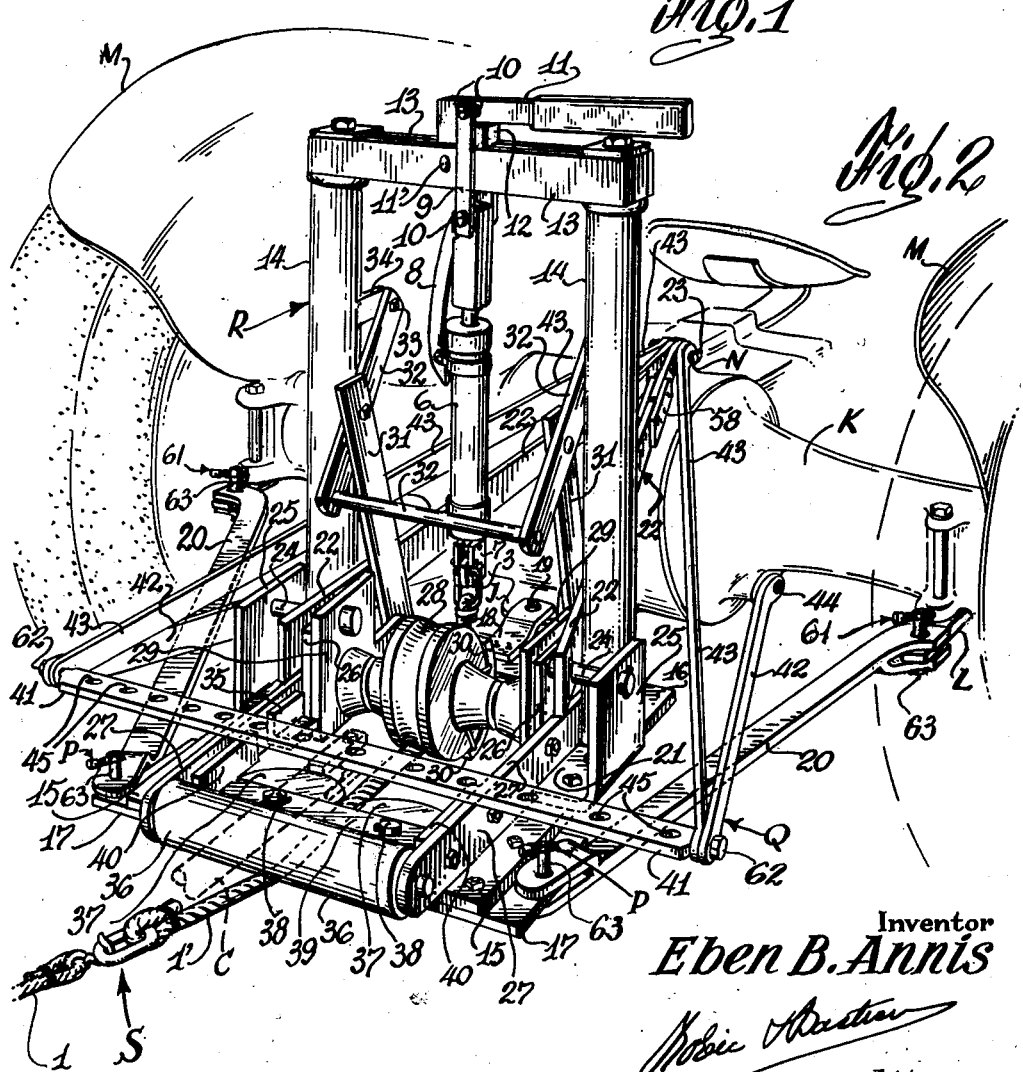
Figure 2 is a perspective view of the device of the invention shown attached to the rear axle housing of a tractor.

Referring now more particularly to the drawings, in which like reference characters indicate like elements throughout, the letter A indicates a tractor of any conventional design for farm use which pulls a vehicular load indicated by the letter B and shown in this case as being a two-wheeled vehicle. The load B is connected to the tractor A by means of a rigid drawbar C which may be subjected to compression as well as tension stresses.

The drawbar C is hingedly connected to the tractor at the connection point D and is rigidly secured to the load B at two spaced points E.

The connection point D is preferably disposed at the same level as the rear axle F of the tractor A. The auxiliary device or preventer unit, according to the invention, is connected to the tractor A in a manner which will be described hereafter, and to the load B at a point H preferably positioned at the rear of said load for better stability of the tractor and load arrangement. Depending on the type of wagon used, and especially with four-wheeled wagons, the point may be displaced immediately to the rear end of the drawbar.

Said preventer unit comprises a flexible cable made in two sections 1 and 1' detachably connected by a simple hook and loop arrangement S. The cable section 1 has a rear loop 2 connected to an eye bolt 4 which threadily engages a right-angle bracket 5 rigidly secured to the vehicular load B at the point H. The cable section 1' is provided at its front end with a ring 3 connected to a tension maintaining unit 6, described in the above mentioned patent application, by means of a suitable latch 7. The unit 6 is provided at its other end with a hooking lever 8 for removable attachment to a pair of links 9 interconnected at their ends by bolts 10 and nuts 10'. Upper bolt 10 passes through an L-shaped toggle lever 11 adapted to abut a block 12 and pivotally connected at 11' between a pair of transverse braces 13 supported on the upper end of two spaced opposed upright posts 14. The posts 14 are secured to the longitudinal side members 15 of L cross-section and being parts of a horizontally extending rectangular frame further including a forward transverse member 16 and a rear transverse member 17. The posts 14 and the rectangular frame form an L-shaped bracket R connected to the rear extension J depending from the axle housing K of the tractor A, by means of a link plate 18 rigidly secured to the forward transverse frame member 16 and removably attached to the said extension J by means of a king pin 19. The bracket R is further held against sideways displacement by means of rigid braces 20 secured to the rear transverse frame member 17 at one end and to the side extensions L at the rear axle housing K normally used for securing the mud guards M. King pins 63 and special locking pins P, described hereafter, are used to attach the rear ends of said braces 20 to member 17, while king pin 63 and locking pins 61 serve to secure the forward ends of said braces 20 to extensions L. The locking pins 61 are identical with the locking pins 29 illustrated and described in the above mentioned patent application Serial No. 181,671. Finally the bracket R is held against vertical displacement by means of special composite braces 22 attached at one end to the upright integral extension N of the rear axle housing K of the tractor A as by means of a bolt 23, and at the other end by means of stud shafts 24 mounted on spaced support members 25, and 26, themselves secured to the side members 15. The supports 25 have a lower horizontal flange 21 secured directly to the horizontal flange of side members 15 while the support 26 takes the form of a plate fastened to the vertical flange 27 of members 15.

A cable engaging grooved wheel 28 is rotatively supported on journals consisting of L-shaped plates 29 each pivotally mounted on a stud shaft 24, the wheel 28 is provided with a guard 30 for preventing disengagement of the cable 1. The L-shaped plates 29 are connected by means of links 31 to a yoke member 32 pivotally attached at 33 to ears 34 depending from the posts 14 near the upper end thereof.

Because the wheel 28 has its axis spaced from the stud shafts 24, it will be understood that upon downward movement of the yoke member 32 said wheel 28 will be displaced from a cable releasing position to a cable engaging and tensioning position shown in full line in Figure 3. The rearwardly directed thrust exerted by cable 1 on the wheel 28 will maintain the latter in the last mentioned position in which position the L-shaped journal plates 29 will abut the stops 35 secured to the vertical flanges 27 of the side members 15.

A guiding roller 36 is rotatively mounted at the rear end of the vertical flanges 27 and a pair of opposed idle wheels 37 rotatable about vertical shafts 38, are located between the roller 36 and the wheel 28. Their vertical shafts 38 are journalled in the rear transverse frame member 17 and a top plate 39 secured at both ends to the vertical flanges 27 by means of integral upstanding ears 40. The idle wheels 37 serve to prevent transverse movement of cable 1 as shown in Figure 4.

The draw bar C of the load B is hingedly connected at D to a draw frame Q comprising a transverse bar 41 disposed above the roller 36 and removably secured to one end of braces 42 and 43 by bolts 62, said braces being respectively secured at their other end underneath the rear axle housing K at 44 and to the top extension N by the bolt 23. Thus the transverse bar 41 is rigidly held against sideways and vertical displacement and form a rigid unit with the tractor A. Said draw frame Q is secured to the tractor A independently of the L-shaped bracket R described hereinabove. The transverse bar 41 which is standard tractor equipment, is provided with a plurality of spaced holes 45 of which only the center hole is used for attaching the draw bar C.

The locking pin P shown more particularly in Figures 7 to 9 is specially designed for quick removal from and for secure attachment to a king pin 63, despite the presence of mud, snow and the like. It comprises a spindle 46 engageable with a cross bore at the end of king pin 63, and having a transverse groove 47 at both ends for receiving a rectangular wire loop 48 one end of which passes also through a head 49 in the form of a cup shaped member slidably mounted on one end of the spindle 46 and urged upwardly or out of engagement with the latter by means of a coil spring 50 surrounding the spindle 46 and its ends engaging annular grooves 51 and 52 made on the end face of said head 49 and on the end face of a collar 53 respectively. Said collar 53 is integral with the spindle 46 near the middle portion thereof for abutting the king pin 63. It must be noted that, for preventing the wire loop 48 from becoming disengaged from the upper groove 47, the top of said groove may be closed by pressing the ends together or by welding or by inserting a pin transversely across said groove above the loop 48. It will be understood that a downward thrust on the head 49 as shown in Figure 7 will enable the free end of the wire loop 48 to engage the free groove 47 and that upon release of said head 49 said loop will be maintained firmly against the bottom of said groove 47. Only the lower groove 47 may become clogged and due to the small area thereof it will be relatively easy to clear the same and disengage the wire loop 48 for removal of the locking pin P.

The special composite braces 22, mentioned hereabove, connecting the stud shafts 24 to the top extension N of the rear axle housing K is made in two detachable sections 54 and 55 shown more particularly in Figure 6 which are joined together in the following manner. The section 54 is provided with a tongue 56 engageable with a cooperating groove 57 made in the section 55 and the latter is provided with side plates 58 projecting from both sides of the grooved end thereof. The side plates 58 are provided with registering holes 59 also aligned with the hole 60 of the section member 54 for receiving a locking pin 61 when the tongue 56 of the latter engages the groove 57 of the member 55. This joint will resist bending in all directions. With the use of the composite braces 22, the bracket R may be readily detached from the tractor A. For that purpose bolts 62 are removed to dismount transverse bar 41 from its supporting braces 42, 43 and then only four pins need to be removed: namely the two king pins 63 connecting the braces 20 to the side extensions L and the two locking pins 61 interconnecting the section members 54, 55 of the composite braces 22.

For attaching a load B to the tractor A provided with the attachment according to the invention, the draw bar C is first connected to the transverse bar 41, the cable section 1, which is normally permanently attached at H to the rear of load B is hooked about one foot behind the roller 36 to the cable section 1' by means of hook and loop arrangement S. The cable section 1' is normally kept connected to the latch 7 depending from the resilient extensible unit 6. The top lever 11 is then pivoted from the position shown in dotted line in Figure 5 to the downward position shown in full line to effect initial tension of the cable 1 and the yoke member 32 is similarly downwardly pressed to cause the guiding wheel 28 to engage and tension the cable 1. It should be noted that the resilient extensible unit 6 is of the type described in the co-pending U. S. patent application No. 181,671 mentioned hereabove. The unit 6 will extend up to a certain limit for permitting the tractor A to negotiate uneven ground.

It is obvious that unit 6 can function irrespectively of which end is attached to the cable section 1'. Although, in the drawings, the lever 8 is shown engaging the lower bolt 10, it is understood that if removal of unit 6 is prevented when in this position, due to the particular dimensions of the apparatus, said unit may be reversed: the lever 8 will then hook cable section 1' while latch 7 will attach the unit 6 to bolt 10.

Because the roller 36 engaging the cable 1' is substantially spaced from the rear axle F of the tractor A, a slight rotation of said tractor about its rear axle will cause a substantial downward displacement of the roller 36 resulting in substantial elongation of the unit 6 whereby the ratio: elongation of the unit 6 over the angle of vertical rotation of the tractor is considerably greater than the similar ratio for the arrangement according to the above mentioned patent application in which the unit 6 is directly attached to the rear axle housing K. Therefore, with the arrangement according to the present invention, the maximum limit of rotation of the tractor A may be much more easily adjusted than with the arrangement of said patent application.

While a preferred embodiment according to the invention has been illustrated and described, it is understood that various modifications may be resorted to without departing from the spirit and scope of the appended claims.

I claim:

1. A device for preventing a tractor from turning over backwards when pulling a vehicular load connected to the tractor by a rigid drawbar capable of being submitted to both tension and compression stresses, said device comprising an L-shaped frame member secured to the rear of said tractor, with one leg extending rearwardly of and from the lower end of the second upwardly extending leg, guiding members spacedly mounted on said first leg and an elongated flexible link connected to said load, extending below said draw bar, trained under said guiding members and connected to the upper end of said second leg.

2. A device for preventing a tractor from turning over backwards when pulling a vehicular load connected to the tractor by a rigid drawbar capable of being submitted to both tension and compression stresses, said device comprising a pair of spaced L-shaped frame members secured to the rear of said tractor, each frame member having one leg extending rearwardly of and from the lower end of the second upwardly extending leg, guiding members extending between said L-shaped frame members and spacedly mounted on said first leg, and an elongated flexible link connected to said load, extending below said drawbar, trained under said guiding members and connected to the upper ends of said second legs.

3. A device for preventing a tractor from turning over backwards when pulling a vehicular load connected to the tractor by a rigid drawbar capable of being submitted to both tension and compression stresses, said device comprising a pair of spaced L-shaped frame members secured to the rear of said tractor, each of said frame members having one leg extending rearwardly of and from the lower end of the second upwardly extending leg, a guiding roller rotatively mounted between the free ends of said first legs, a guiding wheel rotatively mounted between said L-shaped frame members adjacent the junction of said first and second legs, and an elongated flexible link connected to said load, extending below said drawbar, trained under said guiding roller and wheel and connected to the upper ends of said second legs.

4. A device for preventing a tractor from turning over backwards for use when the tractor is pulling a vehicular load connected thereto by a rigid drawbar capable of being submitted to both tension and compression stresses, said device comprising a pair of L-shaped frame members, transverse bars maintaining said frame members in spaced relationship, braces securing said frame members to the rear of said tractor, said frame members disposed with one leg extending rearwardly of and from the lower end of the second upwardly extending leg, one of said transverse bars connecting the upper ends of said second legs, a guiding roller rotatively mounted between the free ends of said first legs, a guiding wheel rotatively mounted between said first legs adjacent the junction thereof with said second legs, an elongated flexible link connected to said load, extending below said drawbar, trained under said guiding roller and guiding wheel and attached to the transverse bar connecting the upper ends of said second legs of said L-shaped frame members, a transverse elongated member extending above said first legs and braces connecting said transverse member to said tractor, one end of said drawbar being hingedly and removably connected to said transverse member.

5. A device for preventing a tractor from turning over backwards for use when the tractor is pulling a vehicular load connected thereto by a rigid drawbar capable of being submitted to both tension and compression stresses, said device comprising a pair of L-shaped frame members secured to the rear end of said tractor with one leg extending rearwardly of and from the lower end of the second upwardly extending leg, a guiding roller rotatively mounted between the free ends of said first legs, a rotatable guiding wheel eccentrically pivoted between said L-shaped frame members adjacent the junction of said second and first legs, lever means to pivot said guiding wheel, an elongated flexible link connected to said load extending below said drawbar, trained under said guiding roller and guiding wheel and connected to the upper ends of said second legs so constructed and arranged that the pivotal movement of said guiding wheel by said lever means will cause said guiding wheel to be displaced towards and from a link engaging and tensioning position.

6. A device for preventing a tractor from turning over backwards for use when the tractor is pulling a vehicular load connected thereto by a rigid drawbar capable of being submitted to both tension and compression stresses, comprising a transverse bar secured to the rear of the tractor in spaced relationship, one end of said drawbar being hingedly connected to said transverse bar, a pair of L-shaped frame members, transverse braces connecting said frame members to maintain the same in opposed spaced position, braces rigidly connecting said members to the rear of said tractor in such a manner that one leg of said frame members will extend rearwardly of and from the lower end of the second upright leg and underneath said transverse bar, a guiding roller pivotally mounted between the free ends of said first legs, a pair of journals respectively pivoted to said L-shaped frame members adjacent the junction of said first and second legs, a guiding wheel mounted between said journals with its axis spaced from the pivot connection of said journals, a transverse brace connecting the upper ends of said second legs, an elongated flexible link connected to said load, extending below said drawbar, trained under said guiding roller and guiding wheel and attached to said last mentioned transverse brace, and lever means connected to said pivoted journals for displacing said guiding wheel to and from a link engaging and tensioning position.

7. A device for preventing a tractor from turning over backwards for use when the tractor is pulling a load connected thereto by a rigid draw bar capable of being submitted to both tension and compression stresses, said device comprising a pair of opposed spaced L-shaped frame members secured to the rear of said tractor with one leg extending rearwardly of and from the lower end of the second upwardly extending leg, guide members spacedly and rotatively mounted between said first legs, a transverse brace connecting the upper ends of said second legs, a flexible cable attached to said load, extending below said draw bar and engaging said guide members, an extensible resilient unit connected at one end to the free end of said cable and at its other end to said transverse brace, said extensible resilient unit extending between said brace and one of said guide members.

8. A device for preventing a tractor from turning over backwards for use when the tractor is pulling a vehicular load connected thereto by a rigid draw bar capable of being submitted to both tension and compression stresses, comprising a pair of spaced opposed L-shaped frame members secured to the rear of said tractor with one leg extending rearwardly of and from the lower end of the second upwardly extending leg, a guiding roller rotatively mounted between the free ends of said first legs, a guiding wheel rotatively mounted between said L-shaped frame members adjacent the junction of said first and second legs, a transverse bar extending above said first legs of said L-shaped frame members and rigidly secured to said tractor, one end of said draw bar being hingedly connected to said transverse bar, a transverse brace rigidly connecting the upper ends of said second legs, a flexible cable connected to said load, extending below said draw bar and engaging said guiding roller and guiding wheel, an extensible resilient unit connected to said transverse brace at one end and to the free end of said cable at its other end, said extensible resilient unit extending between said transverse brace and said guiding wheel and between the second legs of said L-shaped frame members.

9. A device for preventing tractors from turning over backwards as claimed in claim 8 wherein said guiding wheel is eccentrically pivoted on said L-shaped frame members, and lever means to pivot said guiding wheel to and from a cable engaging and tensioning position.

10. A device for preventing tractors from turning over backwards as claimed in claim 9 comprising a lever pivoted on said transverse brace connecting the upper ends of said second legs, the first mentioned end of said extensible resilient unit being pivotally attached to said lever.

11. A device as claimed in claim 10 including supporting braces rigidly connecting said L-shaped frame members to said tractor, said braces being removably connected to the top and bottom portions of the rear axle housing of said tractor.

12. A device for preventing a tractor from turning over backwards for use when the tractor is pulling a vehicular load connected thereto by a rigid draw bar capable of being submitted to both tension and compression stresses, comprising a transverse bar extending in spaced relationship with the rear of said tractor, braces connecting said transverse bar to said tractor, one end of said draw bar being hingedly connected to said transverse bar, a pair of spaced opposed L-shaped members secured to the rear end of said tractor independently of said transverse bar and each having a first leg extending underneath said transverse bar and rearwardly of and from the lower end of the second upwardly extending leg, a guiding roller rotatively mounted between the free ends of said first legs, bearing plates pivotally mounted on each of said frame members adjacent to the junction of said first and second legs, a guiding wheel journalled on said pivoted bearing plates at points spaced from the pivotal connection of said plates to said frame members, a yoke member pivoted to said second legs, links pivotally connecting said yoke member to said bearing plates whereby displacement of said yoke member will pivot said bearing plates and said guiding wheel relatively to said L-shaped frame members, a pair of opposed idle wheels mounted between said guiding roller and said guiding wheel and rotatable about vertical axes, a transverse brace connecting the upper ends of said second legs, a lever pivoted on said transverse brace, a flexible cable connected to said load, extending below said draw bar, engaging said guiding roller, said opposed idle wheels and said guiding wheel, an extensible resilient unit attached to the free end of said cable, and at its other end to said lever whereby operation of said yoke member and of said lever will displace respectively said guiding wheel into cable engaging position and said extensible resilient unit towards said transverse brace.

EBEN B. ANNIS.

REFERENCES CITED

The following references are of record in the file of this patent:

UNITED STATES PATENTS

| Number | Name | Date |
|---|---|---|
| 1,372,396 | Blackburn | May 22, 1921 |
| 1,408,081 | Deems | Feb. 28, 1922 |
| 1,478,428 | Duncan | Dec. 25, 1923 |
| 1,492,487 | Stokes | Apr. 29, 1924 |
| 1,713,332 | Davis | May 14, 1929 |